(12) United States Patent
Cooper (10) Patent No.: US 10,669,993 B2
(45) Date of Patent: Jun. 2, 2020

(54) WIND TURBINE TOWER REINFORCEMENT SYSTEM

(71) Applicant: General Electric Company, Schenectady, NY (US)

(72) Inventor: Gregory Edward Cooper, Greenfield Center, NY (US)

(73) Assignee: General Electric Company, Schenectady, NY (US)

(*) Notice: Subject to any disclaimer, the term of this patent is extended or adjusted under 35 U.S.C. 154(b) by 164 days.

(21) Appl. No.: 15/607,893

(22) Filed: May 30, 2017

(65) Prior Publication Data

US 2018/0347547 A1    Dec. 6, 2018

(51) Int. Cl.
*E04H 12/08* (2006.01)
*F03D 13/20* (2016.01)
*E02D 27/42* (2006.01)

(52) U.S. Cl.
CPC ........... *F03D 13/20* (2016.05); *E02D 27/425* (2013.01); *E04H 12/085* (2013.01); *F05B 2240/912* (2013.01)

(58) Field of Classification Search
CPC ....... E04H 12/08; E04H 12/085; E04H 12/16; E04H 12/22; E04H 12/2292; E04H 12/2276; E04H 12/2269; E04H 12/342; F05B 2240/912; F03D 13/20; E02D 27/425

See application file for complete search history.

(56) References Cited

U.S. PATENT DOCUMENTS

| | | | |
|---|---|---|---|
| 6,868,641 B2 * | 3/2005 | Conner | E01F 9/635 52/165 |
| 8,021,101 B2 | 9/2011 | Segovia et al. | |
| 8,056,297 B2 | 11/2011 | Mathai et al. | |
| 8,087,898 B2 | 1/2012 | Tetambe et al. | |
| 8,490,337 B2 | 7/2013 | Word, III et al. | |
| 8,573,950 B2 * | 11/2013 | Yokoyama | F03D 13/20 416/244 R |
| 8,801,331 B2 * | 8/2014 | Perner | E02D 27/42 405/204 |
| 9,004,875 B2 | 4/2015 | Paura et al. | |
| 9,057,360 B2 | 6/2015 | Tobinaga | |

(Continued)

OTHER PUBLICATIONS

International Search Report and Written Opinion issued in connection with corresponding PCT Application No. PCT/US2018/032216 dated Sep. 20, 2018.

*Primary Examiner* — Jessica L Laux
(74) *Attorney, Agent, or Firm* — Dority & Manning, P.A.

(57) ABSTRACT

A reinforcement assembly for a tower of a wind turbine is disclosed as having at least one generally cylindrical tower section with an exterior wall and an interior wall defining a height and a thickness therebetween. At least one generally cylindrical tower flange is coupled to the tower section, the tower flange having at least one vertical flange portion and at least one horizontal flange portion. At least one adjustable generally cylindrical reinforcing member has, at least one vertical member portion with at least one flexible portion coupled to the exterior wall of the tower section, and at least one horizontal member portion adjustably engaged with at least one adjusting spacer. Adjustment of the adjusting spacer aligns the reinforcing member with an adjacent tower flange.

10 Claims, 6 Drawing Sheets

(56) References Cited

U.S. PATENT DOCUMENTS

| | | | |
|---|---|---|---|
| 10,294,687 B2* | 5/2019 | Brockman | E04H 12/085 |
| 2008/0250752 A1 | 10/2008 | Bowman et al. | |
| 2009/0021019 A1* | 1/2009 | Thomsen | E04H 12/085 |
| | | | 290/55 |
| 2009/0169393 A1* | 7/2009 | Bagepalli | E04H 12/08 |
| | | | 416/248 |
| 2010/0024311 A1 | 2/2010 | Wambeke et al. | |
| 2010/0307097 A1* | 12/2010 | Word | E04H 12/085 |
| | | | 52/651.07 |
| 2011/0140447 A1 | 6/2011 | Paura et al. | |
| 2011/0210233 A1 | 9/2011 | Fang et al. | |
| 2011/0308186 A1 | 12/2011 | Cortina-Ortega et al. | |
| 2014/0230343 A1 | 8/2014 | Lam | |
| 2015/0159635 A1* | 6/2015 | Hayden | E04H 12/085 |
| | | | 290/55 |

\* cited by examiner

WIND TURBINE TOWER REINFORCEMENT SYSTEM

FIELD OF THE INVENTION

The present subject matter relates generally to wind turbines and, more particularly, to a reinforcement system for a wind turbine support tower.

BACKGROUND OF THE INVENTION

Generally, a wind turbine includes a wind tower, a nacelle mounted on the wind tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

Most wind turbines include support towers that include a plurality of tubular-shaped tower support sections. Adjacent tower support sections are coupled at structural connections using welding and/or mechanical fastening of ring flanges to form support tower assemblies. Wind towers are subject to large cyclic loading, which results in a large displacement of tower support sections and increased bending stresses and torsional stresses induced to the tower support members. The flanges of the structural connection between tower sections are preloaded by the bolted connections, such that a compressive stress is generated under the bolt head and nut, which exceeds any fluctuating loads experienced by the tower connection under functional loads, including generator reactive torque, gyroscopic loads due to change of direction of the turbine rotational axis, and dynamic loads due to imbalance or resonance. The mating flange faces are loaded under the nut and bolt, with the loading being relaxed between bolted connections. Axial loads transmitted through the tower about an axis parallel with the vertical axis of the tower are resisted by the friction generated between the flange faces under the clamping load of the bolts by the coefficient of friction between the flanges.

Some support tower members may be subjected to stresses that cause fatigue cracking and/or failure, particularly at the joint between adjacent support tower members and between the tower top and the yaw bearing. The primary mode of failure in the structural connections of wind tower joints can be bolt failure by the compromise of bolt preload. The bolts begin to experience fluctuating loads and stresses once the bolt preload is reduced, and this fluctuating load leads to fatigue failure of the bolt as well as fatigue cracking of nearby steel. Conventional methods for repairing support tower members include disassembling the entire support tower, replacing support tower members, and reassembling the support tower, which is expensive and time consuming.

BRIEF DESCRIPTION OF THE INVENTION

Aspects and advantages of the invention will be set forth in part in the following description, or may be obvious from the description, or may be learned through practice of the invention.

In one aspect, a reinforcement assembly for a tower of a wind turbine is disclosed as having at least one generally cylindrical tower section with an exterior wall and an interior wall defining a height and a thickness therebetween. At least one generally cylindrical tower flange is coupled to the tower section, the tower flange having at least one vertical flange portion and at least one horizontal flange portion. At least one adjustable generally cylindrical reinforcing member has, at least one vertical member portion with at least one flexible portion coupled to the exterior wall of the tower section, and at least one horizontal member portion adjustably engaged with at least one adjusting spacer. Adjustment of the adjusting spacer aligns the reinforcing member with an adjacent tower flange.

In another aspect, a method for reinforcing a tower of a wind turbine is disclosed by: disengaging a top portion of a tower section at a generally cylindrical flanged connection, the flanged connection having at least one upper tower flange and at least one lower tower flange; placing at least one adjusting spacer in a horizontal flange portion of the lower tower flange; engaging the at least one adjusting spacer with a horizontal member portion of a generally cylindrical adjustable reinforcing member; positioning the reinforcing member atop the lower tower flange; and, adjusting the at least one adjusting spacer to align the reinforcing member with the upper tower flange; tightening at least one adjusting nut onto the adjusting spacer to secure the reinforcing member; coupling a vertical member flexible portion of the reinforcing member with the tower section; and reengaging the top portion of the tower section by fastening the upper tower flange to the reinforcing member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a reinforced wind tower flanged connection using a reinforcing member attached to an existing wind tower section as a retrofit. The reinforcing member can have enough structural capability to withstand fatigue and extreme tower loads that are higher than the original tower flange. The reinforcing member can attach like a "cap" on the existing wind tower thereby forming a reinforcing top flange for the wind turbine. The directional legend on the drawings defines vertical (V) and horizontal (H) directions as used herein.

Figure 1:
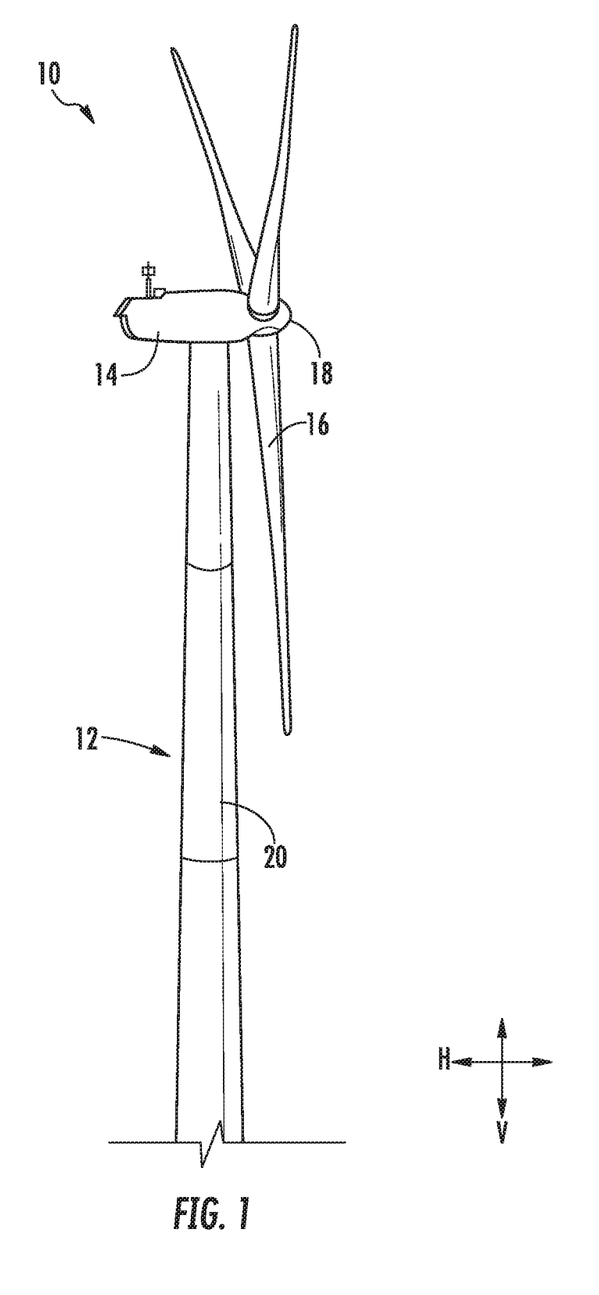
FIG. 1 illustrates one embodiment of a wind turbine of conventional construction.

FIG. 1 illustrates a wind turbine 10 of conventional construction. The wind turbine 10 includes a wind tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

As further shown in FIG. 1, the wind tower 12 according to the present disclosure may be formed from a plurality of wind tower sections 20. Each of the plurality of wind tower sections 20 may be disposed adjacent and coupled to another of the plurality of wind tower sections 20 to at least partially form the wind tower 12. In exemplary embodiments, the wind tower sections 20 may be formed from a suitable metal or metal alloy, such as carbon steel. Alternatively, however, the wind tower sections 20 may be formed from any suitable materials, such as, for example, various suitable composite materials.

Figure 2:
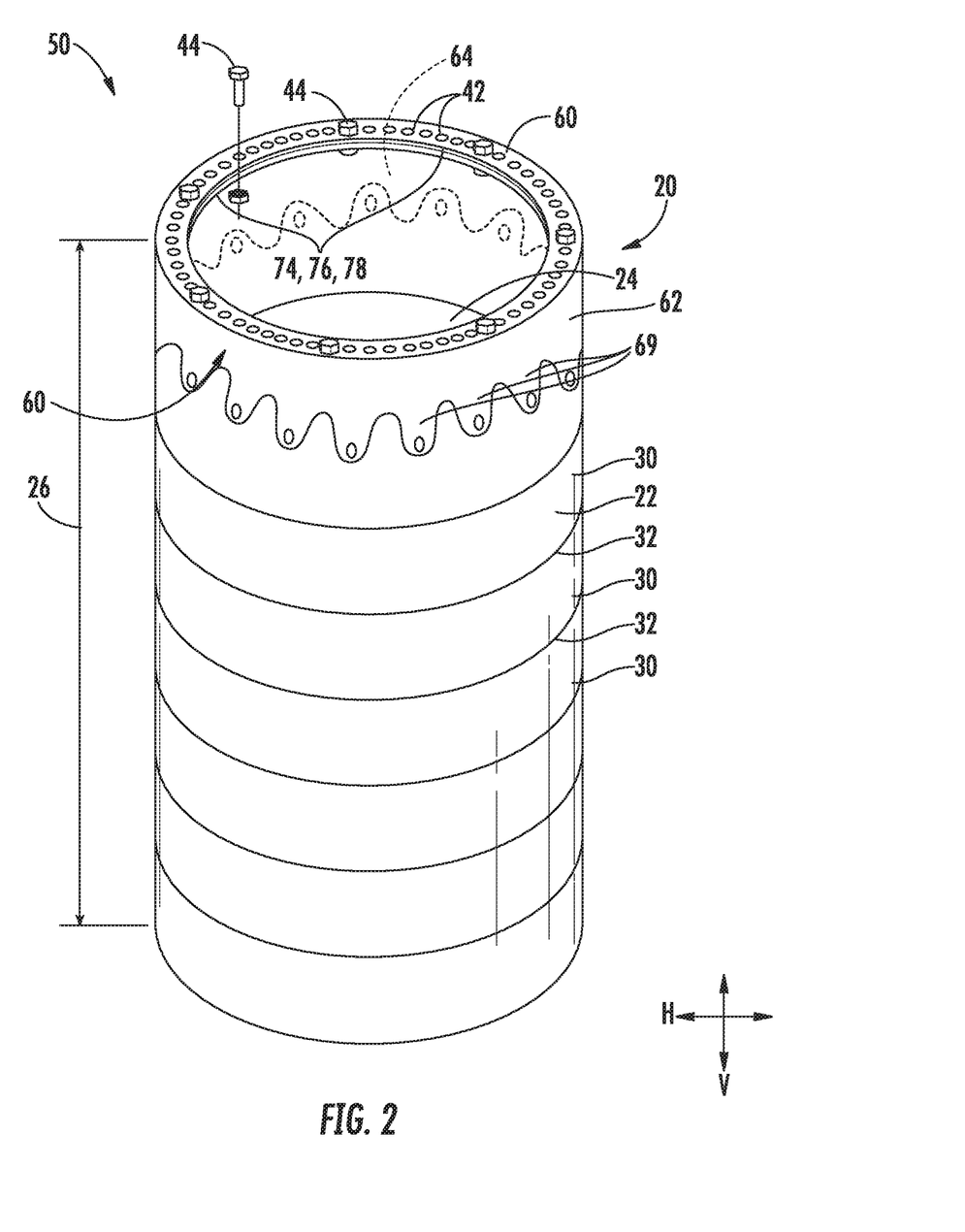
FIG. 2 illustrates a perspective view of one embodiment of a wind turbine tower with a reinforcing member attached to the top flange.

FIG. 2 illustrates one embodiment of a wind tower section 20 according to the present disclosure. As shown, in exemplary embodiments, the wind tower section 20 may be a generally cylindrical wind tower section 20. For example, the cross-sectional shape of the wind tower section 20 may be generally circular, tubular or oval. Further, in some embodiments, the cross-sectional shape of the wind tower section 20 may be generally polygonal, having a plurality of sides such that the polygonal cross-section approximates a generally circular, tubular or oval cross-section.

Figure 3:
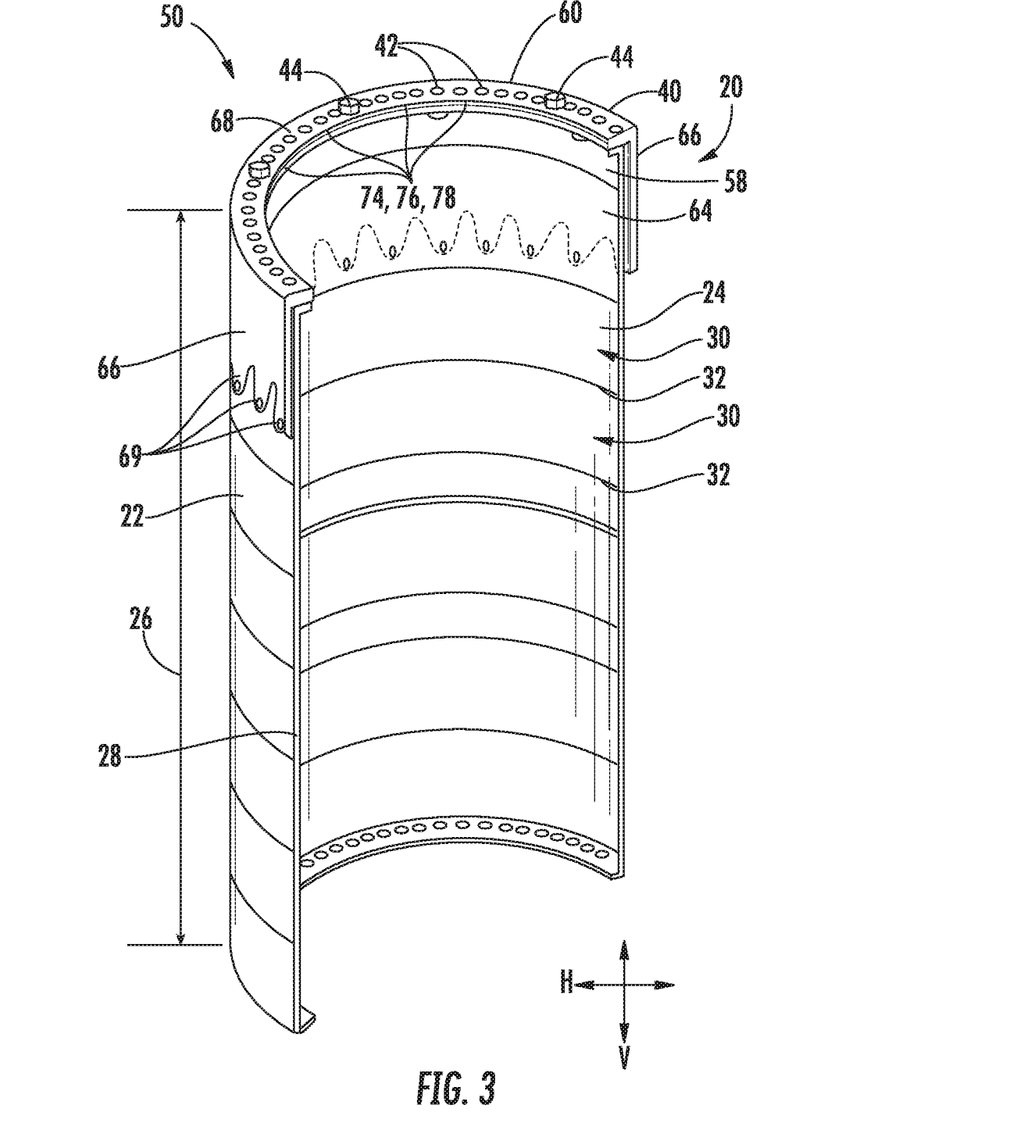
FIG. 3 illustrates a sectional view of one embodiment of the wind tower reinforcement system.
Figure 4:
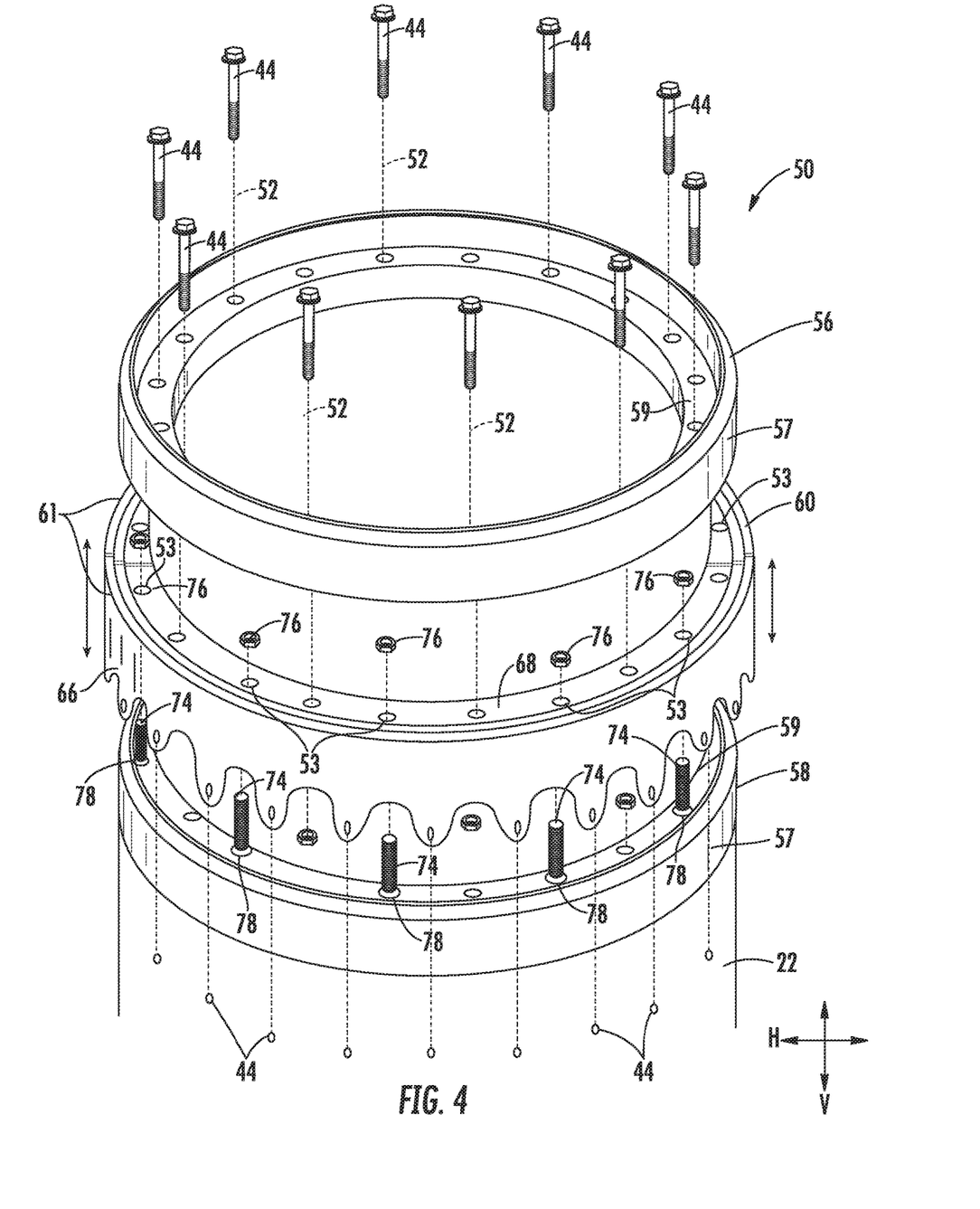
FIG. 4 is an exploded view an embodiment of the wind tower reinforcement system.

The wind tower section 20 according to the present disclosure has an exterior wall 22 and an interior wall 24. The exterior wall 22 and the interior wall 24 may each be generally cylindrical with regard to the wind tower section 20 in general. The exterior wall 22 and interior wall 24 may generally define a height 26 of the wind tower section 20. The exterior wall 22 and interior wall 24 may further generally define a thickness 28 (see FIG. 3) of the wind tower section 20 therebetween.

As further shown in FIG. 2, each of the wind tower sections 20 may, in some embodiments, comprises a plurality of wind tower cans 30. Each of the wind tower cans 30 may be a generally cylindrical portion of the wind tower section 20, and may define a portion of the height 26 of the wind tower section 20 as well as the thickness 28 of the wind tower section 20. Each of the plurality of wind tower cans 30 may be disposed adjacent and coupled to another of the plurality of wind tower cans 30 to at least partially form the wind tower section 20. For example, a plurality of wind tower cans 30 may be stacked end to end to form the wind tower section 20. Further, the wind tower cans 30 may be coupled together by, for example, welding the wind tower cans 30 together at intersections 32 between the adjacent wind tower cans 30. It should be understood, however, that the present disclosure is not limited to welding, and that any suitable fastening device or method may be utilized to couple the wind tower cans 30 together, for example bolted flanges.

It should be understood that the cross-sectional area of the wind tower section 20, and thus the wind tower cans 30, may remain constant or may taper through the height 26 of the wind tower section or portions thereof. For example, in some embodiments, the cross-sectional area of each of the wind tower cans 30 and wind tower sections 20 may decrease through the height 26 or a portion thereof. Further, it should be understood that the wind tower sections 20, that make up the wind tower 12, may all taper or may all have generally constant cross-sections, or one or more of the wind tower sections 20 may taper while other of the wind tower sections 20 may have generally constant cross-sections.

Each of the plurality of wind tower sections 20 may be disposed adjacent and coupled to another of the plurality of wind tower sections 20 to at least partially form the wind tower 12. For example, a plurality of wind tower sections 20 may be stacked end to end to form the wind tower 12. Further, each of the wind tower sections 20 may comprise at least one flange 40 or a plurality of flanges 40. The horizontal flange portion of flanges 40 may be oriented radially inward or radially outward from the centerline of the wind tower 12. The flanges 40 may be configured to couple the wind tower section 20 to an adjacent wind tower section 20. For example, each flange 40 may be disposed at an end of the wind tower section 20. In exemplary embodiments, the flange 40 may define a plurality of bore holes 42. The bore holes 42 may be spaced generally circumferentially about the flange 40. The bore holes 42 may be configured to accept a mechanical fastener 44, such as a nut and bolt combination, a rivet, a screw, or any other suitable mechanical fastener 44, therethrough. To couple the wind tower section 20 to an adjacent wind tower section 20, the flange 40 may be mated with an adjacent flange 40 of the adjacent wind tower section 20, and the bore holes 42 of the mating flanges 40 aligned. For example, an upper tower flange 56 can be aligned with a lower tower flange 58 for mechanically bonding a tower flanged connection using mechanical fasteners 44, for example, bolts and nuts. Mechanical fasteners 44 may be placed through at least a portion of the mating bore holes 42 to couple the wind tower sections 20 together thereby making a bolted flange connection. It should be understood, however, that the present disclosure is not limited to wind tower sections 20 having flanges 40 as described above, and rather that any suitable fastening device or method may be utilized to couple the wind tower sections 20 together.

Figure 5:
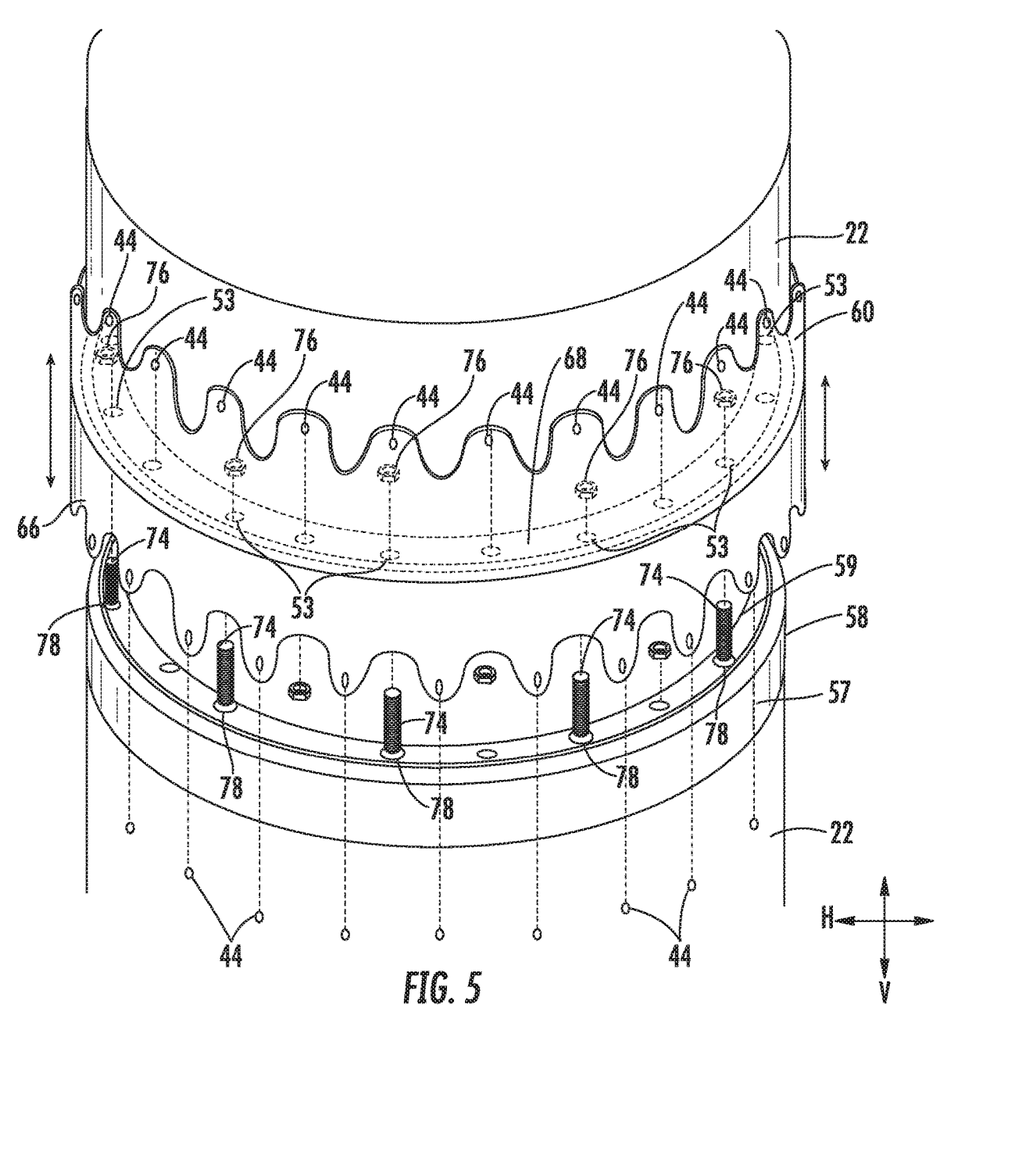
FIG. 5 is an exploded view of another embodiment of the wind tower reinforcement system.
Figure 6:
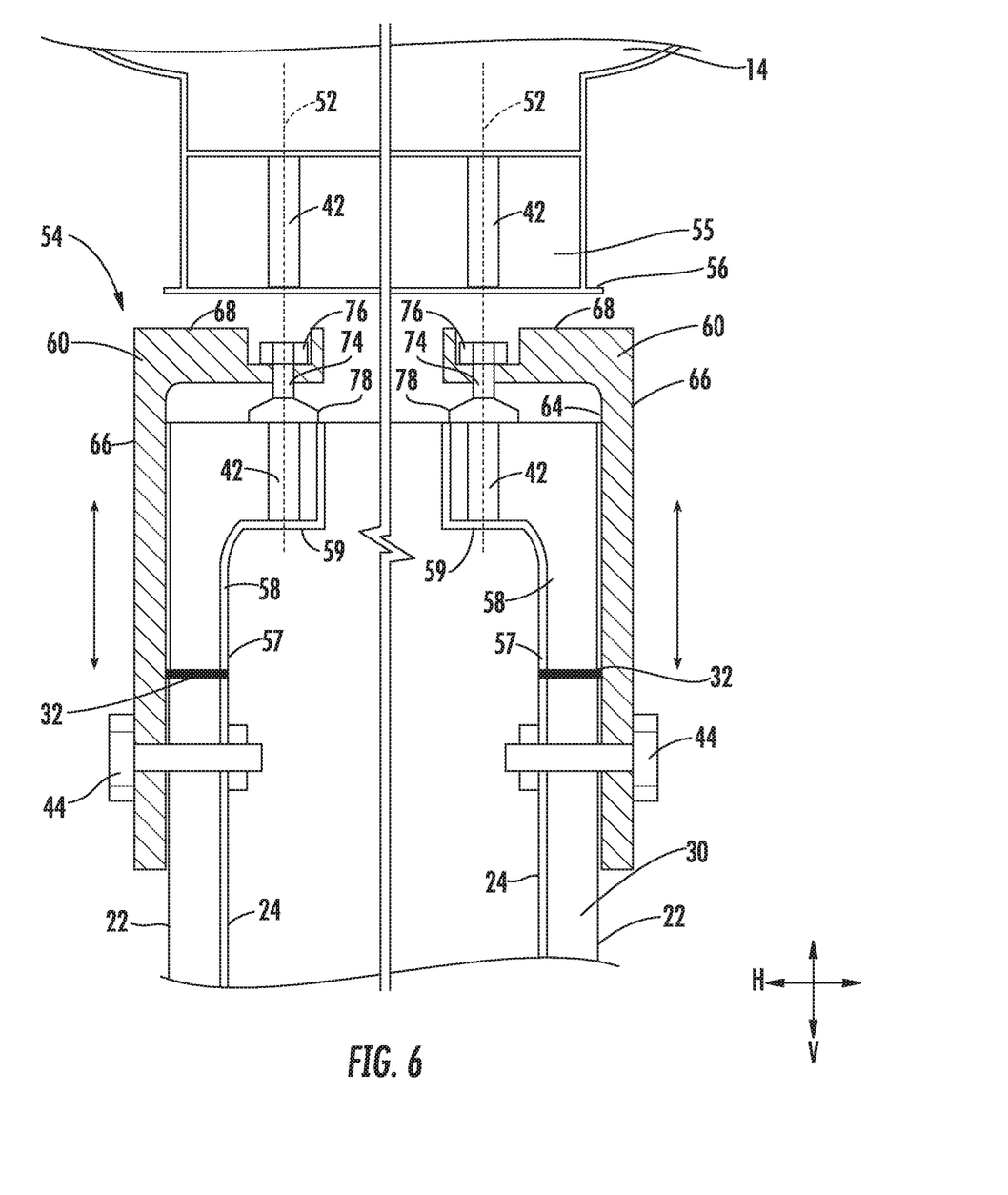
FIG. 6 is a more detailed side view of an embodiment of the reinforcing member connections in the wind tower reinforcement system.

Some support wind tower members may be subjected to stresses that cause fatigue cracking and/or failure, particularly at the intersection 32 between adjacent support wind tower members, particularly between the wind tower top flange 58 and the yaw bearing 56 that is attached to the nacelle 14, as seen in FIG. 5. Thus, a reinforcement system 50 for the wind tower 12 is disclosed. The reinforcement system 50 allows for a wind tower 12 to be retrofitted for a wind turbine 10 that might be experiencing fatigue cracking or that has been upgraded thereby creating larger structural loading on the wind tower 12. The reinforcement system 50 allows for the efficient and cost-effective retrofit of wind towers 12 which may be used in various locations with various environmental conditions. Further, the reinforcement system 50 may allow for existing wind turbines 12 to be upgraded with, for example, heavier components, without requiring replacement of the wind tower 12. Rather, before, during, or after the upgrade, the reinforcement system 50 may be retrofitted on the wind tower 12 to tailor the wind tower 12 for the upgrade.

The reinforcement system 50, as shown in FIGS. 2 thru 6, includes a reinforcement assembly 54, and at least one wind tower section 20 with an existing tower flange 58 that can be the top tower flange 58. Further, the reinforcement system 50 includes at least one reinforcing member 60 or a plurality of reinforcing members 60. The reinforcing member 60 can be broken into segmented reinforcing member portions 61, such as segmented portions of a ring flange positioned end-to-end, for easier installation of the reinforcement assembly 54. The segmented reinforcing member portions 61 can be shaped to a specific tower irregularity. The reinforcing member 60 interacts with the at least one wind tower section 20 to reinforce the at least one wind tower section 20. The reinforcement assembly 54 can be attached to the exterior wall 22 of the wind tower section 20 by drilling holes in the existing wind tower section 20 and fastening with maintenance free fasteners. The geometry of the reinforcing member 60 can be shaped as an unequal leg angle with a vertical member portion 66 and a horizontal member portion 68. The vertical member portion 66 can be descriptively referred to as a 'skirt' portion as it extends to cover a damaged portion of the tower. The reinforcing member 60 can be oriented in any direction necessary to mate with the existing flanged connection. For example, to reinforce an upper flange 56, flexible portions 69 can be disposed vertically upward and secured to an upper portion of the tower section 20, with adjusting spacers 74, for example jacking bolts or shims, extending above or below the horizontal member portion 68 for providing position adjustment of the reinforcing member 60.

Additionally, the vertical member portion 66 of the reinforcing member 60 can extend both vertically upward and vertically downward, as seen in FIG. 5, with the upward portion secured to an upper portion of the tower section 20 and the downward portion secured to a lower portion of the tower section 20. Also, two (first and second) separate reinforcing members 60 can be stacked on top of each other in a dual inverted or flipped fashion such that the upper surface of the horizontal member portions 68 of each dual reinforcing member 60 are in direct contact. In the dual configuration, the vertical member portion 66 of the first reinforcing member 60 points vertically upward and the vertical member portion 66 on the second reinforcing member 60 points vertically downward.

The reinforcement assembly 54 can have at least one generally cylindrical wind tower section 20 with an exterior wall 22 and an interior wall 24 defining a height 26 and a thickness 28 therebetween. At least one generally cylindrical tower flange 58 can be coupled to the wind tower section 20, for example, by welding at the intersection 32. The tower flange 58 can have at least one vertical flange portion 57 and at least one horizontal flange portion 59. At least one adjustable generally cylindrical reinforcing member 60, can have at least one vertical member portion 66 adjustably coupled to the exterior wall 22 of the wind tower section 20, and, at least one horizontal member portion 68 adjustably engaged, for example threaded, with at least one jacking bolt or shim 74, such that the adjusting spacer 74 is adjusted to align the reinforcing member 60 with an adjacent tower flange for mechanical bonding.

The adjusting spacer 74 can be positioned atop a adjusting pad 78 which can be centered atop a adjusting portion of the bore holes 53 in the horizontal flange portion 59 of the tower flange 58. The adjusting portion can include the bore holes 42 portion unoccupied by mechanical fasteners 44. The adjusting portion position can alternate with mechanical fasteners 44 around the perimeter of the reinforcing member 60. The at least one adjusting spacer 74 can be threadably engaged with a adjusting nut 76 configured for securing the position of the adjustable reinforcing member 60. The vertical member portion 66 of the reinforcing member 60 can have a scalloped edge thereby forming vertical member portion flexible portions 69 for mechanically coupling to a non-cylindrical, ovalized, or out-of-round portion of the wind tower section 20. The flexible portions 69 can be configured using any appropriate profile or shape modification that enables bending portions, such as notches, cuts, slits, scallops, or other irregular shaping. The flexible portions 69 can be bent to a non-cylindrical shape to match the tower section 20 profile thereby allowing direct contact between the flexible portions 69 the wind tower section 20. The flexible portions 69 are them mechanically coupled to the tower section 20 using any suitable mechanical fasteners. The reinforcing member 60 can be threadably engaged with a yaw bearing assembly 55 that is coupled to a nacelle 14 of the wind turbine 10.

A method for reinforcing a tower of a wind turbine 10 can include the steps of; disengaging a top portion of a wind tower section 20 at a generally cylindrical flanged connection, the flanged connection can have at least one upper tower flange 56 and at least one lower tower flange 58; placing at least one adjusting spacer 74 atop a adjusting pad 78 that is generally positioned atop a adjusting portion of the bore holes 53 in a horizontal flange portion 59 of the least one lower tower flange 58; engaging the adjusting spacer 74 with a horizontal member portion 68 of a generally cylindrical adjustable reinforcing member 60; positioning the reinforcing member 60 atop the lower tower flange 58; and aligning the reinforcing member 60 into final position by adjusting at least one adjusting spacer 74.

Additional method steps can include tightening at least one adjusting nut 76 onto the adjusting spacer 74 to hold final position of the reinforcing member 60. Then coupling the vertical member portion 66 of the reinforcing member 60 with the wind tower section 20, for example, using maintenance-free mechanical fasteners. And finally reengaging the top portion of the wind tower section 20 by fastening the upper tower flange 56 to the reinforcing member 60 with mechanical fasteners 44. The upper tower flange 56 can be integrated with a yaw bearing assembly 55 thereby positioning the reinforced flanged connection at the top of the wind tower 12.

A wind turbine 10 is also disclosed as having a nacelle 14, a rotor 18 coupled to the nacelle 14, the rotor 18 having one or more rotor blades 16 attached thereto, and a tower 12 supporting the nacelle. The tower 12 can have a reinforcement system 50 as disclosed herein.

It should be appreciated that the reinforcement system 50 disclosed herein can be applied to any flanged wind tower connection, for example, the reinforcing member 60 can be applied to an upper tower flange 56, a lower tower flange 58, an intermediate tower flange, and/or a foundation flange. The reinforcing member 60 also can be oriented with the scalloped edges and flexible portions 69 pointed upward or downward for connection to a tower section 20. Also, the reinforcing member can have multiple horizontal member portions 68 and multiple vertical member portions 66 pointed in both upward and downward directions for providing more secured attachment to the tower section 20. Additionally, the reinforcing member can take the shape of a wide flange or similar structural shape to provide additional structural support.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A reinforcement assembly for a tower of a wind turbine, comprising:
   at least one generally cylindrical tower section comprising an exterior wall and an interior wall defining a height and a thickness therebetween;
   at least one generally cylindrical tower flange coupled to the tower section, the tower flange comprising at least one vertical flange portion and at least one horizontal flange portion; and,
   at least one adjustable generally cylindrical reinforcing member, the reinforcing member comprising at least one vertical member portion, the vertical member portion surrounding the at least one generally cylindrical tower flange and comprising at least one flexible portion that covers a portion of the exterior wall of the tower section and is coupled to the exterior wall of the tower section, and at least one horizontal member portion adjustably engaged with at least one adjusting spacer,
   wherein adjustment of the adjusting spacer aligns the reinforcing member with an adjacent tower flange.

2. The reinforcement assembly of claim 1, wherein the at least one generally cylindrical tower flange is positioned atop the tower section.

3. The reinforcement assembly of claim 1, wherein the at least one adjusting spacer is positioned atop an adjusting pad.

4. The reinforcement assembly of claim 3, wherein the adjusting pad is centered atop an adjusting portion of bore holes in the horizontal flange portion of the tower flange.

5. The reinforcement assembly of claim 4, wherein the adjusting portion of bore holes are unoccupied by mechanical fasteners.

6. The reinforcement assembly of claim 5, wherein the adjusting portion of bore holes is positioned alternately with mechanical fasteners around the perimeter of the reinforcing member.

7. The reinforcement assembly of claim 1, wherein the reinforcing member comprises segmented reinforcing member portions.

8. The reinforcement assembly of claim 1, wherein the at least one adjusting spacer is adjustably engaged with an adjusting nut configured for securing the reinforcing member.

9. The reinforcement assembly of claim 1, further comprising at least two reinforcing members dually configured with an upper surface of the horizontal member portions of each reinforcing member in direct contact and the vertical member portion of the each reinforcing member extending in opposing directions.

10. The reinforcement assembly of claim 9, wherein the flexible portion further comprises at least one vertical member portion modification of notches, cuts, slits, scallops, and combinations thereof.

* * * * *